US012748790B2

(12) United States Patent
Kervin et al.

(10) Patent No.: US 12,748,790 B2
(45) Date of Patent: Sep. 29, 2026

(54) HYBRID DATABASE INTERFACE WITH INTENT EXPANSION

(71) Applicant: International Business Machines Corporation, Armonk, NY (US)

(72) Inventors: Karina Elayne Kervin, Sacramento, CA (US); Manish Kesarwani, Bengaluru (IN); Satyajeet Raje, White Plains, NY (US); Nergal Issaie, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 351 days.

(21) Appl. No.: 17/940,494

(22) Filed: Sep. 8, 2022

(65) Prior Publication Data

US 2024/0086437 A1 Mar. 14, 2024

(51) Int. Cl.

*G06F 16/00* (2019.01)
*G06F 16/332* (2019.01)
*G06F 16/3329* (2025.01)
*G06F 16/334* (2025.01)

(52) U.S. Cl.

CPC ...... *G06F 16/3344* (2019.01); *G06F 16/3328* (2019.01); *G06F 16/3329* (2019.01)

(58) Field of Classification Search

CPC ............. G06F 16/3344; G06F 16/3328; G06F 16/3329
USPC .......................................................... 707/728
See application file for complete search history.

(56) References Cited

U.S. PATENT DOCUMENTS

| | | | |
|---|---|---|---|
| 6,675,159 B1 | 1/2004 | Lin et al. | |
| 8,468,163 B2 | 6/2013 | Gupta et al. | |
| 9,367,536 B2 * | 6/2016 | Raina | G06F 16/24537 |
| 9,448,995 B2 | 9/2016 | Kurz | |
| 9,747,390 B2 | 8/2017 | Cooper et al. | |
| 10,002,189 B2 | 6/2018 | Cheyer | |
| 10,509,814 B2 | 12/2019 | Lastra Diaz et al. | |
| 10,649,990 B2 | 5/2020 | Harris et al. | |
| 10,853,396 B2 | 12/2020 | Miseldine et al. | |

(Continued)

OTHER PUBLICATIONS

Saha et al.; ATHENA: An Ontology-driven System For Natural Language Querying Over Relational Data Stores, VLDB Endowment, vol. 9, No. 12, pp. 1209-1220, Aug. 1, 2016.

(Continued)

*Primary Examiner* — Monica M Pyo
(74) *Attorney, Agent, or Firm* — Steven M. Bouknight

(57) ABSTRACT

An embodiment includes generating an intent string representative of a user's intention based on an input string from the user. The embodiment generates a search string that includes text from the input string and text from the intent string, and then executes a text-based query and an ontology-based query against a graph database using the search string. The embodiment generates a combined set of search results from search results of the text-based query and search results of the ontology-based query. The embodiment generates final relevance scores for the combined set of search results by adjusting at least a portion of preliminary relevance scores of the combined set of search results. The embodiment generates a query response that includes the combined set of search results ranked according to the final relevance scores.

20 Claims, 8 Drawing Sheets

(56) References Cited

U.S. PATENT DOCUMENTS

| | | | |
|---|---|---|---|
| 10,977,164 B2 | 4/2021 | Saha et al. | |
| 11,176,323 B2 | 11/2021 | Bull et al. | |
| 11,200,222 B2 | 12/2021 | Sen et al. | |
| 11,288,294 B2 | 3/2022 | Wason et al. | |
| 11,790,006 B2 * | 10/2023 | Prakash | G06F 16/90335 |
| 2019/0188285 A1 * | 6/2019 | Scheau | G06N 5/022 |
| 2020/0272651 A1 * | 8/2020 | Luo | G06F 16/212 |
| 2020/0387551 A1 | 12/2020 | Hays et al. | |
| 2021/0064932 A1 * | 3/2021 | Wang | G06F 16/3329 |
| 2021/0294829 A1 | 9/2021 | Bender et al. | |
| 2021/0342380 A1 | 11/2021 | Luus et al. | |
| 2022/0035866 A1 | 2/2022 | Carrier et al. | |
| 2022/0051665 A1 | 2/2022 | Bade et al. | |
| 2022/0138216 A1 | 5/2022 | Kesarwani et al. | |
| 2022/0156299 A1 | 5/2022 | Kervin et al. | |
| 2022/0172040 A1 * | 6/2022 | Kazi | G06N 3/09 |
| 2024/0386015 A1 * | 11/2024 | Crabtree | G06F 16/9024 |

OTHER PUBLICATIONS

Sen et al.; ATHENA++: Natural Language Querying For Complex Nested SQL Queries, VLDB Endowment, vol. 13, No. 11, pp. 2747-2759, Aug. 1, 2020.

Damljanovic et al.; Natural Language Interfaces to Ontologies: Combining Syntactic Analysis and Ontology-based Lookup through the User Interaction, Extended Semantic Web Conference On, pp. 106-120, May 30-Jun. 2, 2010.

Sukys et al.; SBVR Based Natural Language Interface to Ontologies, Journal Of Information Technology And Control, vol. 46, No. 1, pp. 118-137, Feb. 23, 2017.

Solis-Sanchez et al.; Toward A Natural-Language Interface In Ontologies For Disambiguation, Research In Computer Science, vol. 149, No. 8, pp. 1227-1241, Aug. 2020.

Zhu et al., A natural language interface to a graph-based bibliographic information retrieval system, Data & Knowledge Engineering, vol. 111, Sep. 2017, pp. 73-89.

Formica et al., A Bayesian approach for semantic search based on DAG-shaped ontologies, Lecture Notes in Computer Science book series (LNISA, vol. 10439), Aug. 2, 2017.

Rocha et al., A hybrid approach for searching in the semantic web, WWW '04: Proceedings of the 13th international conference on World Wide Web, May 17, 2004, pp. 374-383.

Fernandez et al., Semantically enhanced Information Retrieval: An ontology-based approach, Web Semantics: Science, Services and Agents on the World Wide Web, vol. 9 Issue 4, Dec. 1, 2011, pp. 434-452.

Stojanovic et al., An approach for the ranking of query results in the semantic web, pp. 500-516, 2003.

Rada et al., Development and application of a metric on semantic nets, IEEE Transactions on Systems, Man, and Cybernetics, vol. 19, No. 1, pp. 17-30, Jan./Feb. 1989.

Thenmalar et al., Ontology based semantic similarly ranking of documents, ACAI '11: Proceedings of the International Conference on Advances in Computing and Artificial Intelligence, Jul. 21-22, 2011, pp. 107-110.

Xamena et al., A structural analysis of topic ontologies, Information Sciences, vol. 421, Aug. 2017.

* cited by examiner

HYBRID DATABASE INTERFACE WITH INTENT EXPANSION

BACKGROUND

The present invention relates generally to a method, system, and computer program product for data management. More particularly, the present invention relates to a method, system, and computer program for hybrid database interfaces with intent expansion.

A graph database is a type of database that has a structure that is based on mathematical graph theory. A graph database has a collection of nodes connected by edges. The nodes represent entities, whereas the edges represent relationships between entities. In a graph database, data is stored in nodes, which typically includes attributes of the entity represented by the node. Data may also be stored in the edges, which typically includes attributes of the relationship between the connected entities.

Graph databases may have nodes that represent different types of entities. For example, a graph database may include nodes that represent people, where the attributes include a name, and other nodes that represent property, such as vehicles, where the attributes include make, model, and year. In this example, edges may include "purchased," "sold," and "sold property to" relationships, for example indicating a person who purchased or sold a particular vehicle, and another person who sold property to the first person, and so on. Thus, graph databases provide a flexible and intuitive way to view and store data.

SUMMARY

The illustrative embodiments provide for a hybrid database interface with intent expansion. An embodiment includes generating an intent string representative of a user's intention based on an input string received as an input by the user, where the input includes a query request directed to querying a graph database. The embodiment also includes generating a search string that includes text from the input string and text from the intent string. The embodiment also includes executing a text-based query against the graph database using the search string and executing an ontology-based query against the graph database using the search string. The embodiment further includes generating a combined set of search results from a first set of search results and a second set of search results, where the first set of search results is from the text-based query, and where the second set of search results is from the ontology-based query. The embodiment also includes generating final relevance scores for the combined set of search results by adjusting at least a portion of preliminary relevance scores of the combined set of search results. The embodiment also includes generating a query response that includes the combined set of search results ranked according to the final relevance scores. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
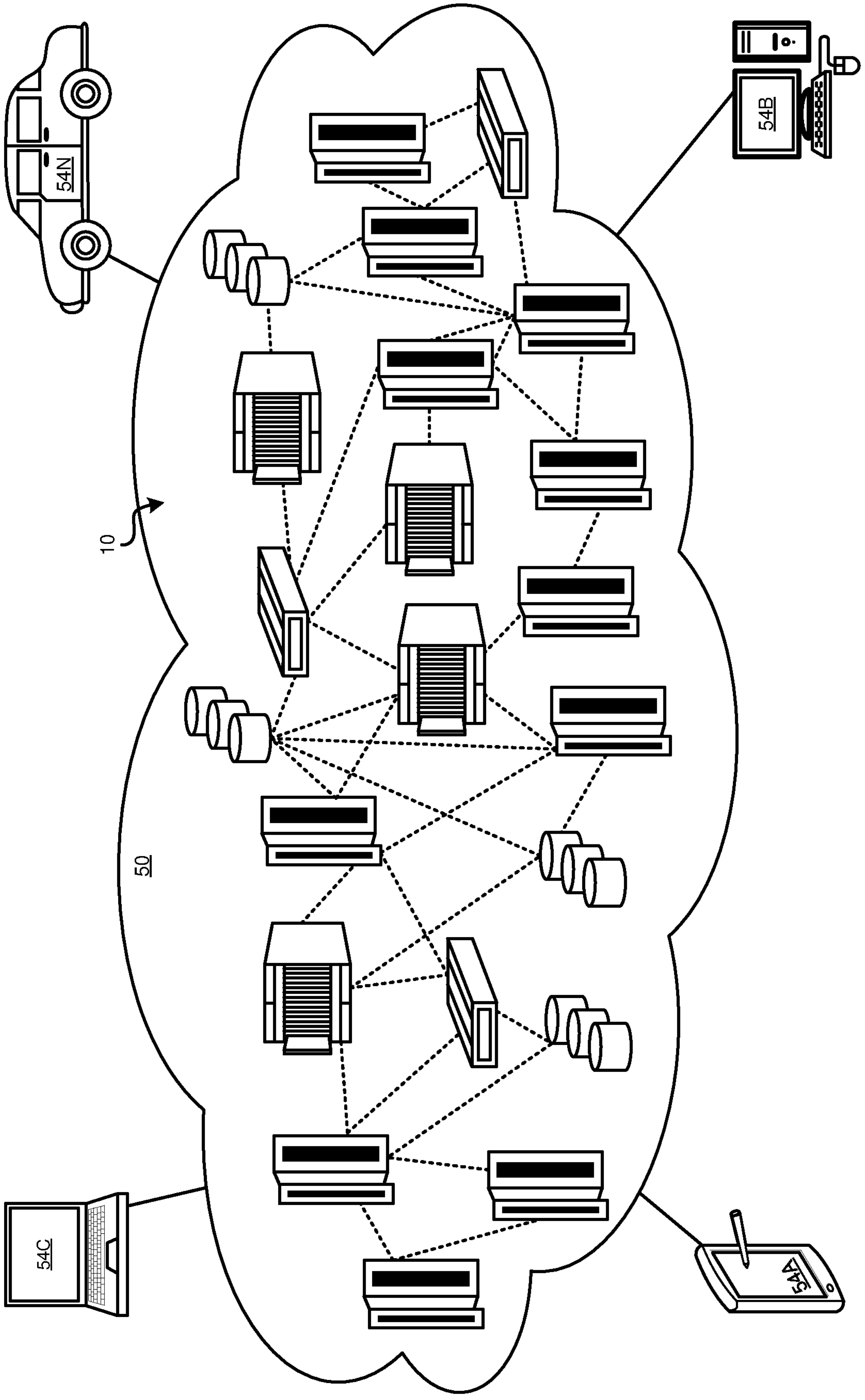
FIG. 1 depicts a cloud computing environment according to an embodiment of the present invention.

Graph databases have grown in popularity in recent years due in part to the flexible and intuitive approach they offer for storing and visualizing data. Graph databases are leveraged in a variety of use cases, such as ontology-based applications (e.g., data discovery and healthcare domains), and semantic networks and knowledge graphs (e.g., used for various artificial intelligence applications).

An ongoing challenge and active area of research centers around developing an efficient and effective natural language interface to data stored in a graph database. One approach is an entity-based technique that involves extracting the entities and their relationships from a natural language query and translating them to an internal representation of the underlying data. The internal representation is then used to generate a query in the language used by the graph database. While this approach can be used to generate complex, multifaceted queries, this approach is restrictive in that it requires natural language queries to be phrased in a very particular way.

Another approach uses text analysis or other machine learning methods to rank the similarity of a search query to ontology concepts. This approach tends to be more flexible to variations in how natural language queries are phrased. The user does not need to know how an ontology is structured to get an answer to their query. However, this approach requires large amounts of data, either training data for the machine learning methods or descriptive text for the text analysis methods. Also, text analysis methods do not take advantage of the relationships between concepts defined in the ontology.

Disclosed embodiments recognize that a hybrid approach that combines techniques and expands the user query with intent extraction offers advantages of other techniques without the problems typically associated with them. Intent extraction (also referred to as intent recognition or intent detection) refers to processing a natural language input from a user in such a way so as to determine an objective that may be explicit or implicit in the user's words. "Intent" includes purposes, objectives, and/or goals expressed, implicitly or explicitly, in a user's input. A computer or processor-based system may use natural language processing (NLP) techniques to autonomously perform intent extraction on a user's input. An example of an application of intent extraction is its use in "smart" devices that operate based on voice or text commands. Intent extraction allows such devices to perform actions based on a variety of different phrases rather than requiring specific words or phrases. For example, a smart light switch may turn on an interior light in response to a variety of phrases such as "turn this light on," "turn on the interior light," and "interior light on" rather than requiring one specific command by extracting the intent of the user's words.

An embodiment can be implemented as a software application. The application implementing an embodiment can be configured as a modification of an existing data analysis system, as a separate application that operates in conjunction with an existing data analysis system, a standalone application, or some combination thereof.

In some embodiments, a user is presented with a natural language interface that allows users to formulate free-text database queries that are expressed in natural language, as opposed to a form-based or keyword-based search. A natural language interface allows users to query a database in the same manner they might ask another person for information using common words and phrases in a conversational manner as they would normally be spoken. A natural language interface does not require a user to input any special characters, such as an asterisk or plus symbol, and does not require any particular format or syntax.

In some embodiments, a database interface receives a natural language search string input by a user and expands the query according to the user's intent. The database interface processes the user's input string using natural language processing (NLP) to extract a phrase from the input string and generate an embedding representative of the extracted phrase.

For example, in some embodiments, NLP is used to generate a vector embedding of the extracted phrase that represents the phrase in a vector space. The interface projects the vector representation of the extracted phrase into a vector space along with vector representations of phrases extracted from one or more data sources. For example, in some embodiments, metadata from one or more data sources relevant to the user's interests or business are used to derive phrases that are represented in the vector space with the phrase extracted from the user's input. Similar phrases can then be determined based on distance measurements between the vector representing the user's input and the vectors representing the phrases from other data sources.

Once a most similar phrase is identified, that phrase is considered to be aligned with the user's intent. The interface appends text from the closest phrase in order to expand the text in the user's query before submitting it to the database. This has the effect of expanding the user's query from a single string of text to two or more strings that amount to different ways of asking for the same information. This improves the user's ability to retrieve the most relevant data by issuing a single search query rather than having to re-word the query multiple times to get all of the most relevant data.

In some embodiments, the interface executes multiple types of searches against a single graph database based on the same expanded search string. For example, in some embodiments, the interface executes a text-based query against the graph database using the search string and also executes an ontology-based query against the graph database using the search string. The text-based query involves matching the text from the expanded input string to textual properties of indexed nodes and relationships (edges) of the graph database. The ontology-based query involves generating a network template that includes text from the expanded input string and matches nodes and relationships (edges) of the graph database to the network template.

In some embodiments, the interface receives search results from both queries and merges them into a combined set of search results. For example, in some embodiments, the search results include respective sets of data tables, and within each set of search results, each table is associated with a respective relevance score.

In some such embodiments, each set of search results is independently ranked according to respective sets of relevance scores. In some such embodiments, the relevance scores are determined differently for different types of searches. For example, an algorithm used to score search results for the ontology search may be different than the algorithm used to score search results for the index search. In some embodiments, the range of scores may differ as well. For example, one algorithm may assign scores in a range of zero to ten, while another algorithm may assign scores in a range of zero to one hundred, or zero to one, or some other range. Thus, in some embodiments, the interface normalizes or otherwise adjusts the scores from the ontology search and/or the index search so that they are more comparable to each other (i.e., the values are adjusted to a same scale) and can therefore be used to rank the combined search results. The exact technique used to adjust the scores will be implementation-specific depending on various constraints, such as how the ranges of scores used by the two types of searches differ from each other, as well as possible time and performance constraints.

In some embodiments, the interface compares the tables returned from both types of searches to determine whether any table is included in both sets of search results. In some such embodiments, if a table is discovered to be in both sets of search results, this is an indication that the table is likely to be particularly relevant to the user's search request. In such a case, the interface increases the score for that table in order to increase that table's ranking in the combined search results. For example, in some embodiments, the interface increases the score for a table that appears in both sets of search results by a predetermined percentage of the table's score.

In some embodiments, once all such score adjustments have been made, the scores are treated as final scores that are used to rank the tables from the combined sets of search results into one final aggregated ranked set of tables. In some such embodiments, the interface then generates a query response that is provided to the user that includes the combined set of search results ranked according to the final relevance scores.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
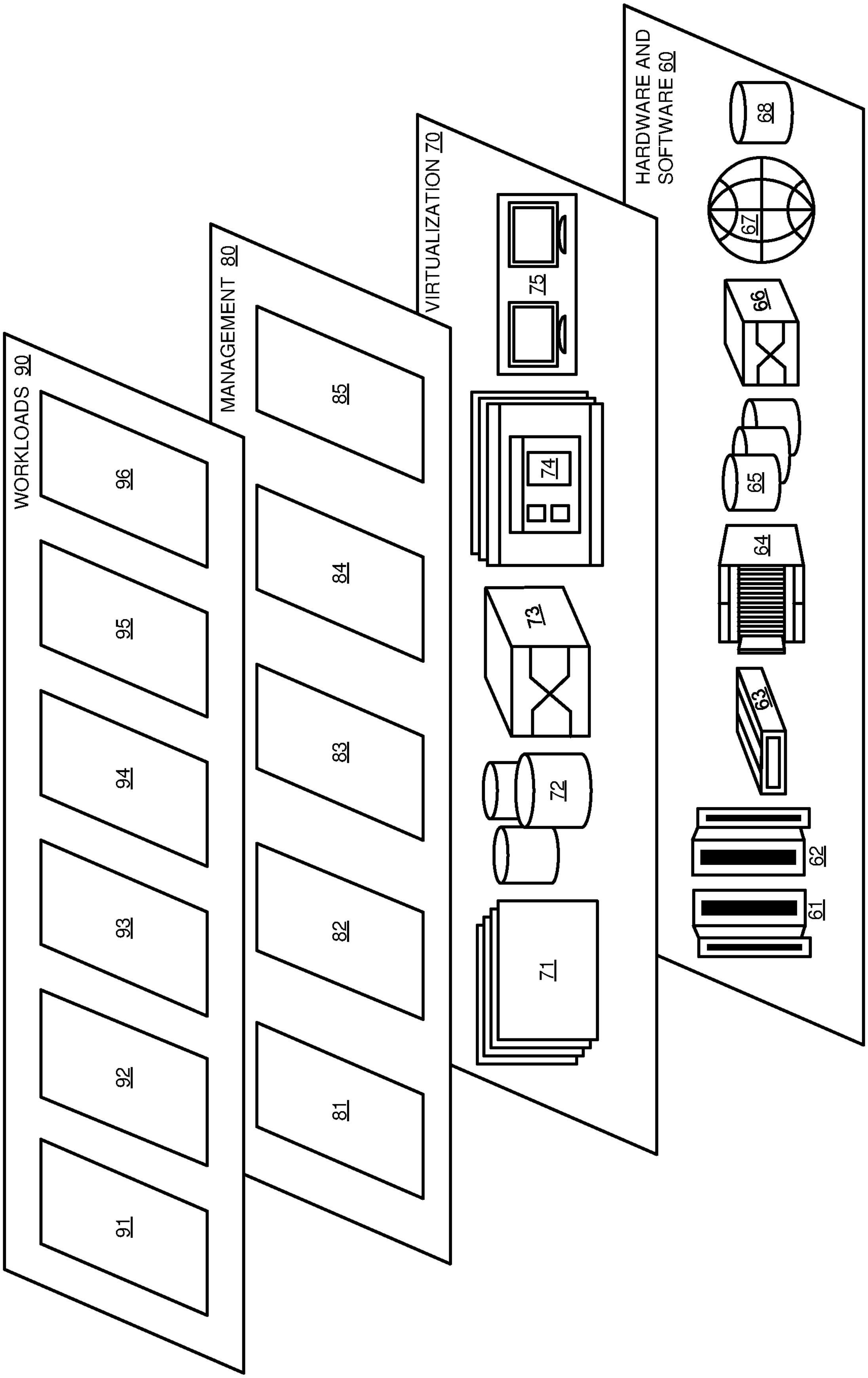
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for hybrid database interface processing, including processing for intent expansion of query requests. In some embodiments, the workloads and functions 96 also works in conjunction with other portions of the various abstraction layers, such as those in hardware and software 60, virtualization 70, and management 80 to accomplish the various purposes of the disclosed embodiments.

Figure 3:
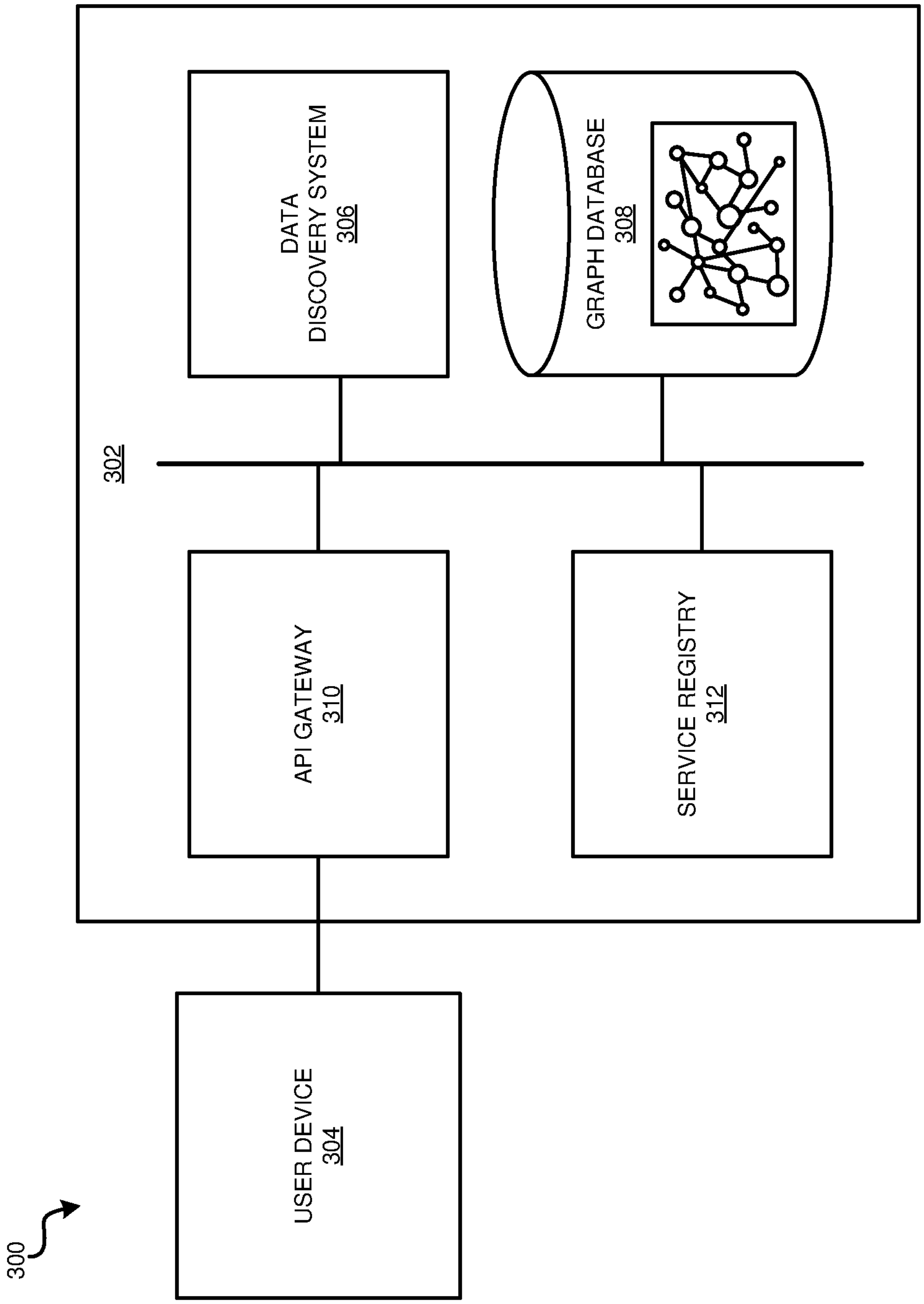
FIG. 3 depicts a block diagram of an example cloud computing environment in accordance with an illustrative embodiment.

With reference to FIG. 3, this figure depicts a block diagram of an example cloud computing environment 300 in accordance with an illustrative embodiment. In the illustrated embodiment, the cloud computing environment 300 includes service infrastructure 302 that includes a data discovery system 306 that provides a hybrid database interface for a graph database 308 in accordance with an illustrative embodiment. In some embodiments, the data discovery system 306 is deployed in workloads layer 90 of FIG. 2.

In the illustrated embodiment, the service infrastructure 302 provides services and service instances to a user device 304. User device 304 communicates with service infrastructure 302 via an Application Programming Interface (API) gateway 310. In various embodiments, service infrastructure 302 and its associated data discovery system 306 serve multiple users and multiple tenants. A tenant is a group of users (e.g., a company) who share a common access with specific privileges to the software instance. Service infrastructure 302 ensures that tenant specific data is isolated from other tenants.

In the illustrated embodiment, service infrastructure 302 includes a service registry 312. In some embodiments, service registry 312 looks up service instances of data discovery system 306 in response to a service lookup request such as one from API gateway 310 in response to a service request from user device 304. For example, in some embodiments, the service registry 312 looks up service instances of data discovery system 306 in response to requests related to searching the graph database 308.

In some embodiments, service registry 312 maintains information about the status or health of each service instance including performance information associated each of the service instances. In some such embodiments, such information may include various types of performance characteristics of a given service instance (e.g., cache metrics, etc.) and records of updates.

In some embodiments, user device 304 connects with API gateway 310 via any suitable network or combination of networks such as the Internet, etc. and uses any suitable communication protocols such as Wi-Fi, Bluetooth, etc. Service infrastructure 302 may be built on the basis of cloud computing. API gateway 310 provides access to client applications like the data discovery system 306 and the graph database 308. API gateway 310 receives service requests issued by client applications and creates service lookup requests based on service requests. As a non-limiting example, in an embodiment, the user device 304 executes a routine to initiate a database query request that is transmitted to the data discovery system 306. Also, in some embodiments, the user accesses the data discovery system 306 indirectly through the use of a web application or web browser running on the user device 304 that interacts with the data discovery system 306 via the API gateway 310.

Figure 4:
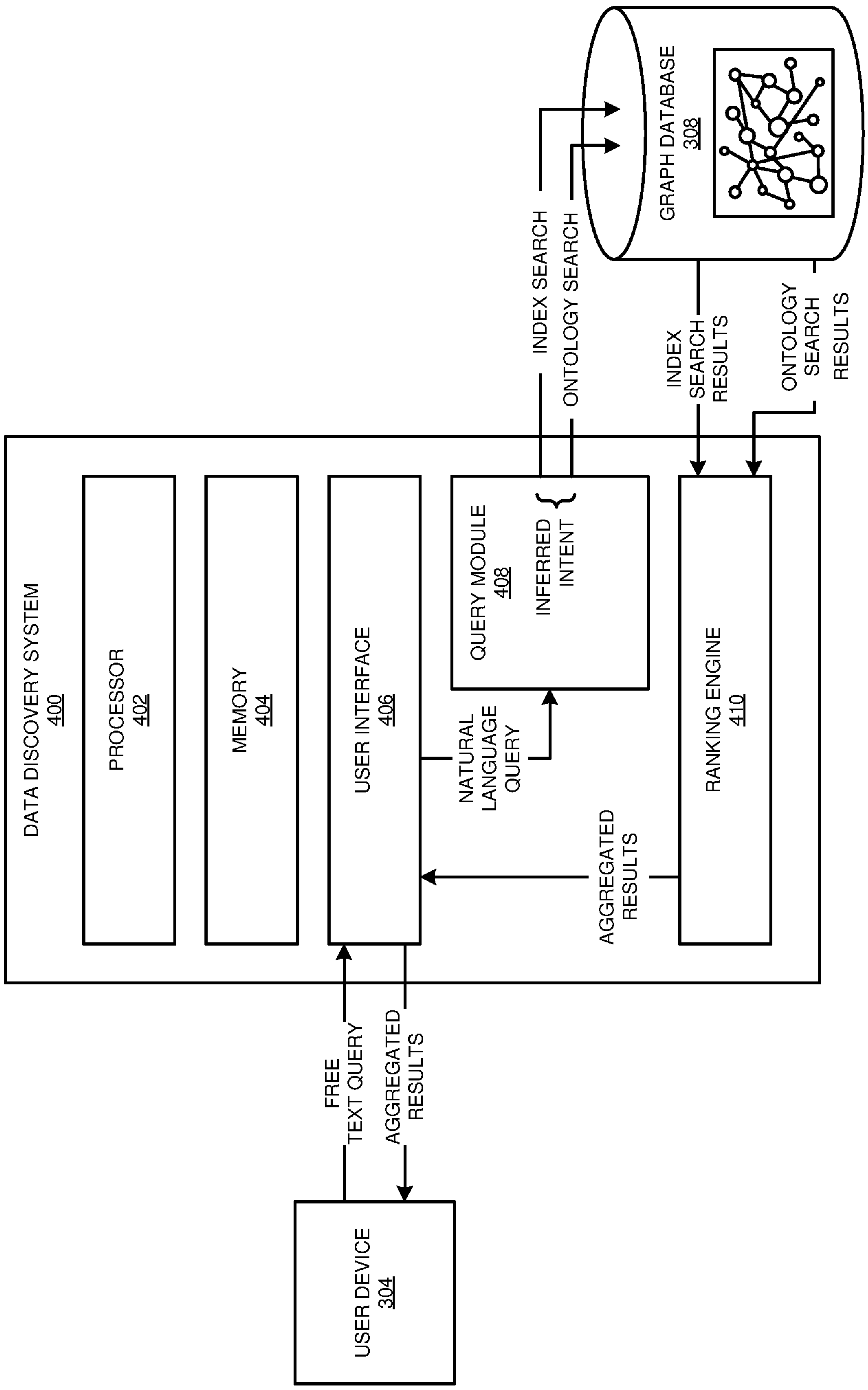
FIG. 4 depicts a block diagram of an example data discovery system in accordance with an illustrative embodiment.

With reference to FIG. 4, this figure depicts a block diagram of an example data discovery system 400 in accordance with an illustrative embodiment. The example embodiment includes query module 408 that issues search commands to the graph database 308 and includes a ranking engine 410 that receives and ranks search results received from the graph database 308 in response to the search commands. In a particular embodiment, the data discovery system 400 is an example of the data discovery system 306 of FIG. 3.

In the illustrated embodiment, the data discovery system 400 includes a processor 402, a memory 404, a user interface 406, a query module 408, and a ranking engine 410. In alternative embodiments, the data discovery system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the data discovery system 400 includes a processing unit ("processor") 402 to perform various computational and data processing tasks, as well as other functionality. The processor 402 is in communication with memory 404. In some embodiments, the memory 404 comprises one or more computer readable storage media with program instructions collectively stored on the one or more computer readable storage media, with the program instructions being executable by one or more processors 402 to cause the one or more processors 402 to perform operations described herein.

The data discovery system 400 includes a user interface 406, which may include a graphic or command line interface. For example, in some embodiments, the user interface 406 is configured to display menus, forms, instructions, notifications, settings, and controls for issuing commands and adjusting settings all associated with the operation of the data discovery system 400. In some embodiments, the user interface 406 is configured to recognize and take action in response to requests programmatically from a user device (e.g., user device 304).

In the illustrated embodiment, the data discovery system 400 includes a query module 408 that serves as a hybrid database interface and performs intent-expansion tasks. In some embodiments, the user interface 406 transmits free text queries to the query module 408 as they are received from the user device 304. In some embodiments, a free text query includes a query request for querying the graph database 308 and further includes a preliminary search string input by the user in the form of an input string of characters, words, or phrases. In some embodiments, the query module 408 performs an intent expansion process that includes processing the free text input from the user so as to determine an objective that may be explicit or implicit in the user's words. In some embodiments, the query module 408 generates an intent string that includes characters, words, or phrases that are representative of the intent determined by the intent expansion process. In some embodiment, the intent string includes characters, words, or phrases indicative of one or more purposes, objectives, and/or goals expressed, implicitly or explicitly, in the free text input from the user. In some embodiments, the query module 408 uses Natural language processing (NLP) techniques to autonomously perform intent extraction on a user's input.

In the illustrated embodiment, the query module 408 generates a search string for querying the graph database 308. The search string may include text from the input string received from the user and/or text from the intent string determined by the query module 408. The query module 408 then executes multiple queries against the graph database 308. In some embodiments, the query module 408 executes different types of queries using the same search string. For example, in the illustrated embodiment, the query module 408 executes an index search and an ontology search. In general, an index search refers to a text-based query that involves matching text from the search string (i.e., text from the input string and text from the intent string) to textual properties of indexed nodes and relationships of the graph database; an ontology search involves generating a network template (e.g., using SPARQL (a recursive acronym for SPARQL Protocol and RDF (Resource Description Framework) Query Language) that includes text from the input string and text from the intent string, and then matching nodes and relationships of the graph database to the network template.

In the illustrated embodiment, the graph database 308 returns search results for both queries, which are received and processed by the ranking engine 410. In the illustrated embodiment, the ranking engine 410 combines and ranks the two sets of search results into a single set of aggregated search results, which are sent to the user interface 406 to be transmitted to the user device 304.

Figure 5:
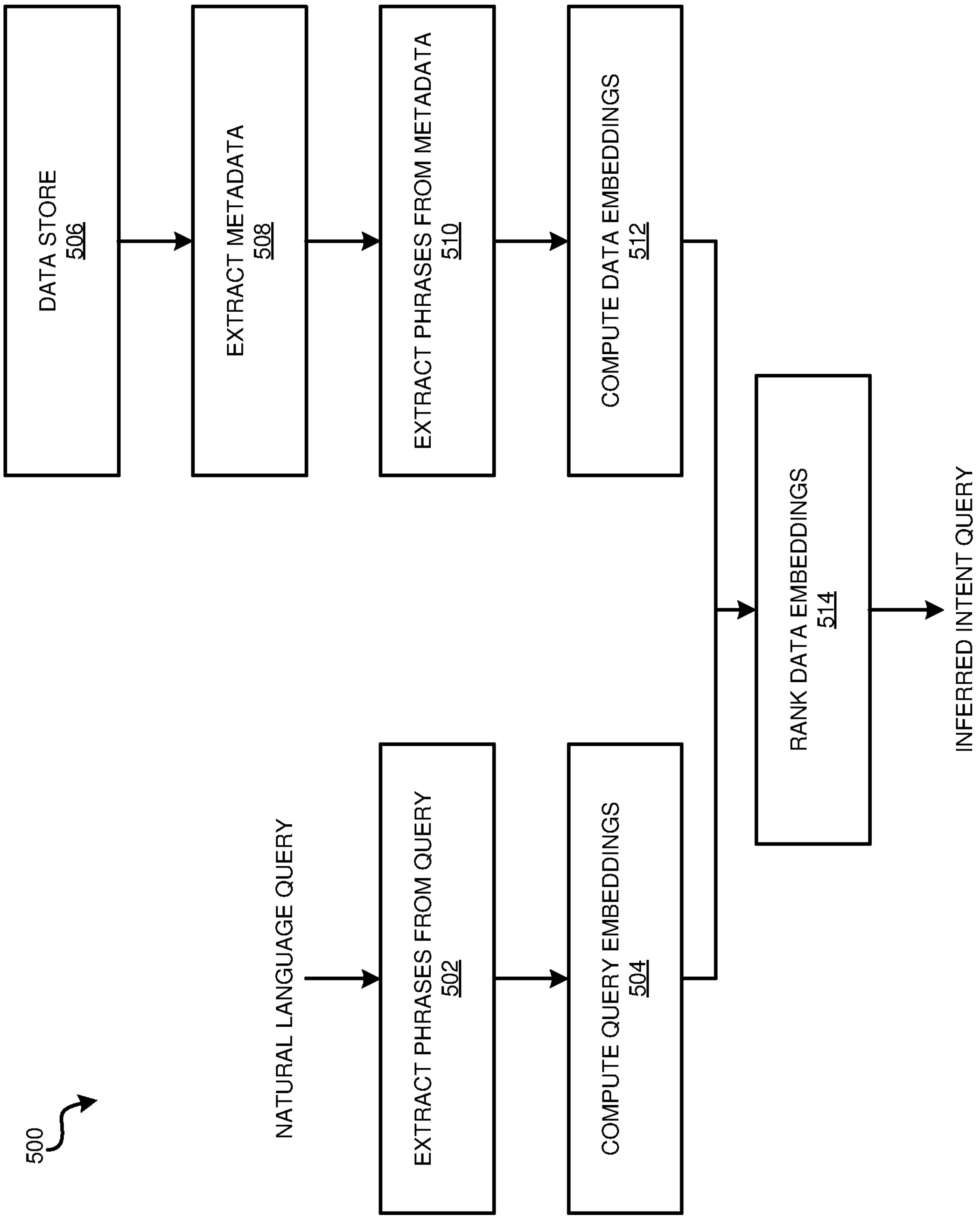
FIG. 5 depicts a flowchart of an intent expansion process in accordance with an illustrative embodiment.

With reference to FIG. 5, this figure depicts a flowchart of an intent expansion process 500 in accordance with an illustrative embodiment. As discussed above in connection with FIG. 4, a user initiates a natural language search of a graph database by submitting a free text query. The data discovery system 400 performs the intent expansion process 500 in order to improve the quality of the search results that will be returned to the user. The intent expansion process 500 augments the input string of text submitted by the user with additional text that expresses the intent behind the user's query. This additional text enables the database to return search results that relate to the purpose, objectives, and/or goals behind the user's search string as opposed to returning search results that merely match the terms in the search string.

In the illustrated embodiment, at block 502, the intent expansion process 500 extracts phrases (or words or n-grams) from the search string submitted by the user. Then, at block 504, the intent expansion process 500 computes embeddings for the user query string. Phrase extraction and embedding is a process that involves identifying phrase delimiters to extract a phrase and then representing the extracted phrase in vector space. The intent expansion process 500 may utilize any of the various known Natural Language Processing (NLP) techniques for phrase extraction and embedding. Once the intent expansion process 500 has the phrase from the user's query represented in vector space, the intent expansion process 500 can compare the user's query vector to other vectors represented in the same space in order to identify similar phrases. For example, the intent expansion process 500 may identify similar phrases by measuring distances between the user's query vector and each of the other vectors and identify the most similar phrases as those that are closest. In the illustrated embodiment, the other phrases are where the distance is related to semantic similarity of the phrases.

In the illustrated embodiment, at block 508, the intent expansion process 500 collects other phrases for comparison by first extracting metadata from a data store 506. The data store 506 may include one or more databases, such as the graph database 308 and/or other databases that may be relevant to the user's business, interests, or industry. Next, at block 510, the intent expansion process 500 extracts phrases (or words or n-grams) from the metadata. Next, at block 512, the intent expansion process 500 computes embeddings for the phrases extracted from the metadata. As with block 502 and block 504, here the intent expansion process 500 may utilize any of the various known NLP techniques for phrase extraction and embedding.

The intent expansion process 500 creates the vector embeddings at block 504 and block 512 so that the resulting vectors occupy the same vector space. This allows the intent expansion process 500 to perform NLP operations for calculating the similarity between a phrase from the user's search string and phrases from the data store metadata, for example using cosine similarity or Euclidean distance. The intent expansion process 500 then ranks the phrases from the data store metadata according to the calculated similarities. The most similar phrase or phrases are considered to be indicative of the user's intent, so the intent expansion process 500 uses text from the most similar phrase(s) to augment the text in the user's query string.

Figure 6:
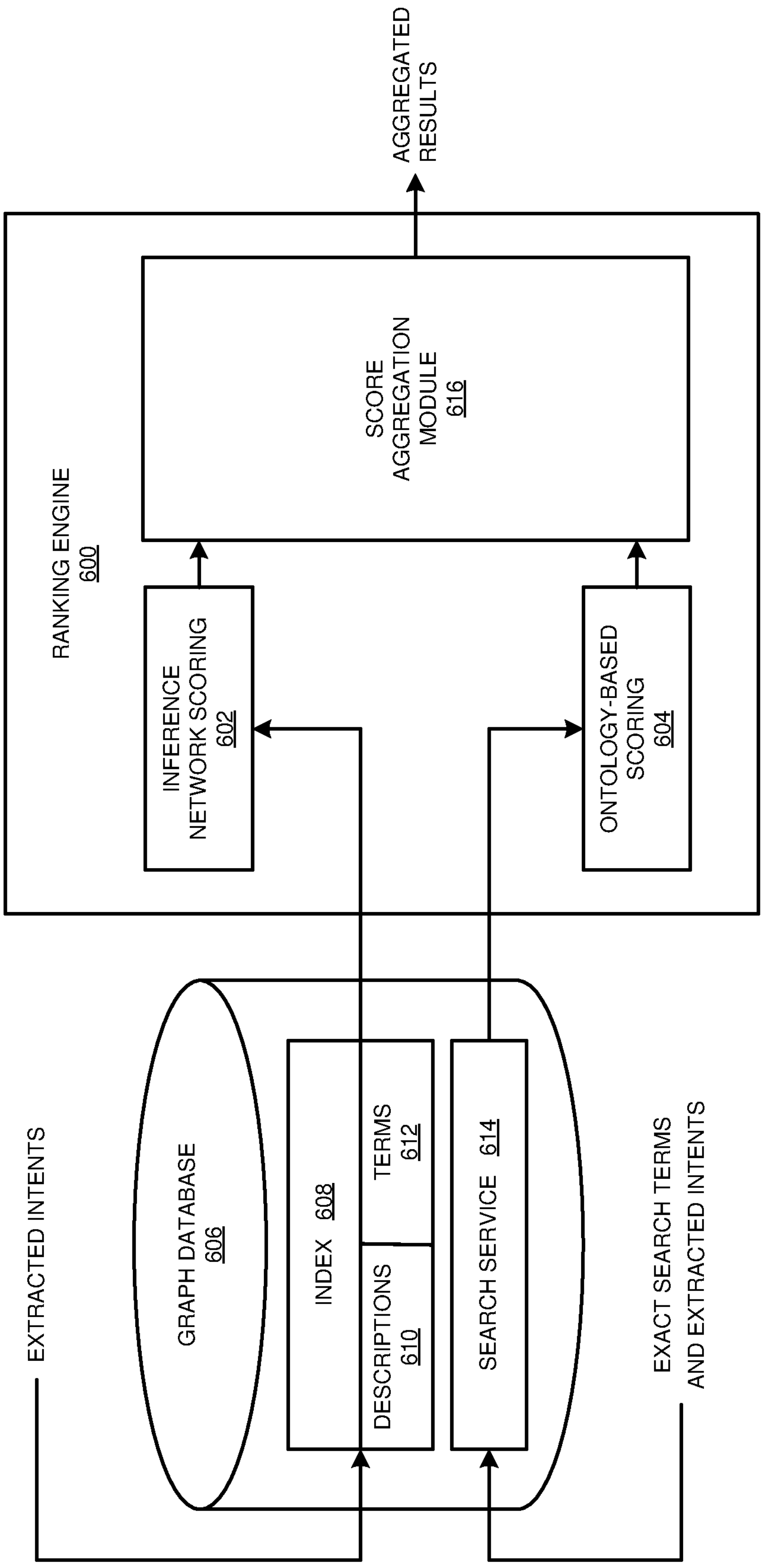
FIG. 6 depicts a block diagram of an example ranking engine in accordance with an illustrative embodiment.

With reference to FIG. 6, this figure depicts a block diagram of an example ranking engine 600 in accordance with an illustrative embodiment. The example ranking engine 600 receives and combines scores resulting from multiple queries of a graph database 606. In some embodiments, the ranking engine 600 is an example of the ranking engine 410 of FIG. 4 and the graph database 606 is an example of the graph database 308 of FIGS. 3 and 4.

In the illustrated embodiment, the ranking engine 600 includes an inference network scoring module 602, an ontology-based scoring module 604, and a score aggregation module 616. In alternative embodiments, the ranking engine 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, an index search and an ontology search are executed against a graph database 606. The index search is a text-based query that searches for relevant results by matching text from a search string (e.g., text from an input string that has been expanded to include extracted intents) to textual properties of an index 608. For example, the textual properties in the illustrated embodiment include indexed descriptions 610 and terms 612 of nodes and relationships of the graph database 606. The ontology search is performed by a search service 614 that generates a network template (e.g., using SPARQL) that includes text from the user's input string and text extracted intents. The search service 614 then searches for relevant results by matching nodes and relationships of the graph database 606 to the generated network template.

In the illustrated embodiment, the ranking engine 600 receives the search results and routes the results from the text-based query to the inference network scoring module 602 and the results from the ontology-based query to the ontology-based scoring module 604. In some embodiments, the inference network scoring module 602 ranks the search results from the text-based query according to relevance scores received with the text-based search results, and the ontology-based scoring module 604 ranks the search results from the ontology-based query according to relevance scores received with the ontology-based search results.

In the illustrated embodiment, the score aggregation module 616 receives the ranked text-based search results from the inference network scoring module 602 and receives the ranked ontology-based search results from the ontology-based scoring module 604. The score aggregation module 616 then combines and ranks the two sets of search results into a single set of aggregated and ranked search results, which are transmitted to the user device 304 as a response to the user's query request.

Figure 7:
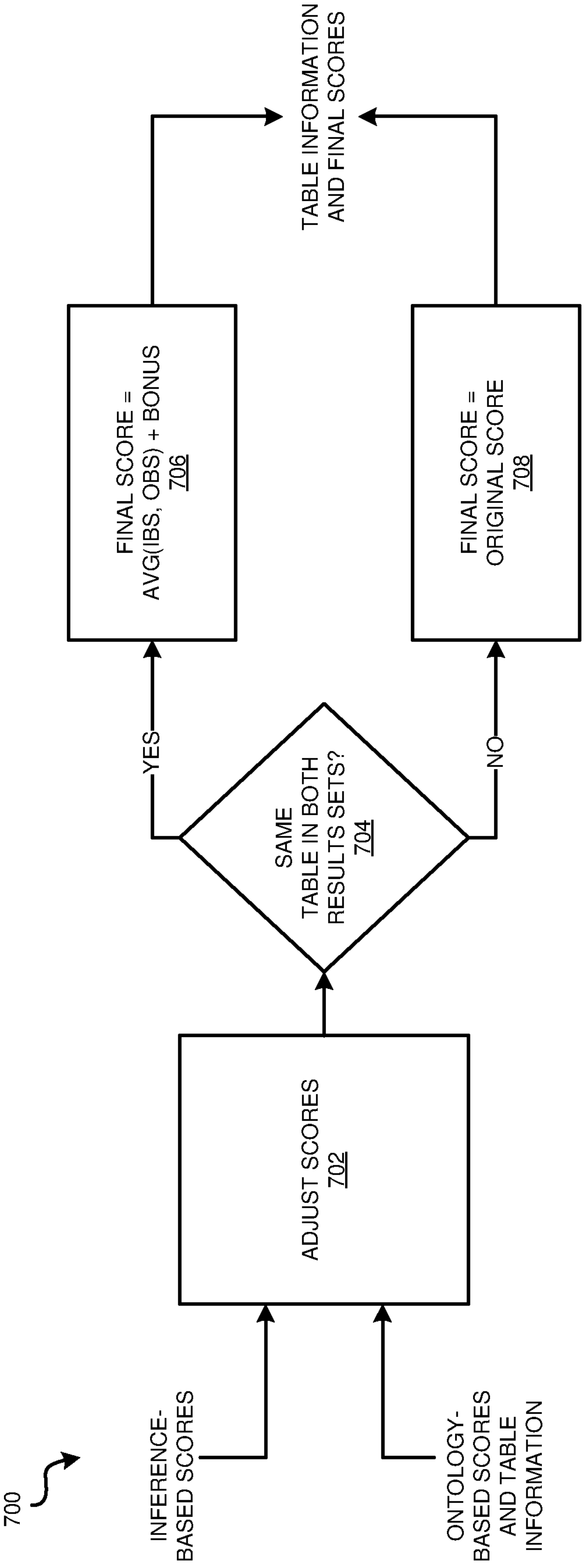
FIG. 7 depicts a flowchart of an example score aggregation process in accordance with an illustrative embodiment.

With reference to FIG. 7, this figure depicts a flowchart of an example score aggregation process 700 in accordance with an illustrative embodiment. In a particular embodiment, the score aggregation module 616 of FIG. 6 carries out the score aggregation process 700.

In the illustrated embodiment, at block 702, the score aggregation process 700 receives the ranked text-based search results and the ranked ontology-based search results. Each set of search results is independently ranked according to respective sets of relevance scores. In some such embodiments, the relevance scores are determined differently for different types of searches. In the illustrated embodiment, the algorithm used to score search results for the ontology search is different than the algorithm used to score search results for the index search. In some embodiments, the range of scores may differ as well. For example, one algorithm may assign scores in a range of zero to ten, while another algorithm may assign scores in a range of zero to one hundred, or zero to one, or some other range. Thus, in some embodiments, the score aggregation process 700 normalizes or otherwise adjusts the scores from the ontology search and/or the index search so that they are more comparable to each other and can be used to rank the combined search results. The exact technique used to adjust the scores will be implementation-specific depending on various constraints, such as how the ranges of scores used by the two types of searches differ from each other, as well as possible time and performance constraints.

Next, at block 704, the score aggregation process 700 compares the tables returned from both types of searches to determine whether any table is included in both sets of search results. If the score aggregation process 700 determines that a table is in both sets of search results, this is an indication that the table is likely to be particularly relevant to the user's search request. In such a case, the process proceeds to block 706 where the score aggregation process 700 increases the score for that table in order to increase that table's ranking in the search results. In some embodiments, the score aggregation process 700 increases the score for a table that appears in both sets of search results by a predetermined percentage of the table's score. Otherwise, for a table that appears in only one of the two search results, the score aggregation process 700 proceeds to block 708 where no further adjustments are made to that table's score. Once all such adjustments have been made, the scores are treated as final scores that are used to rank the tables from the two sets of search results into one final aggregated ranked set of tables.

Figure 8:
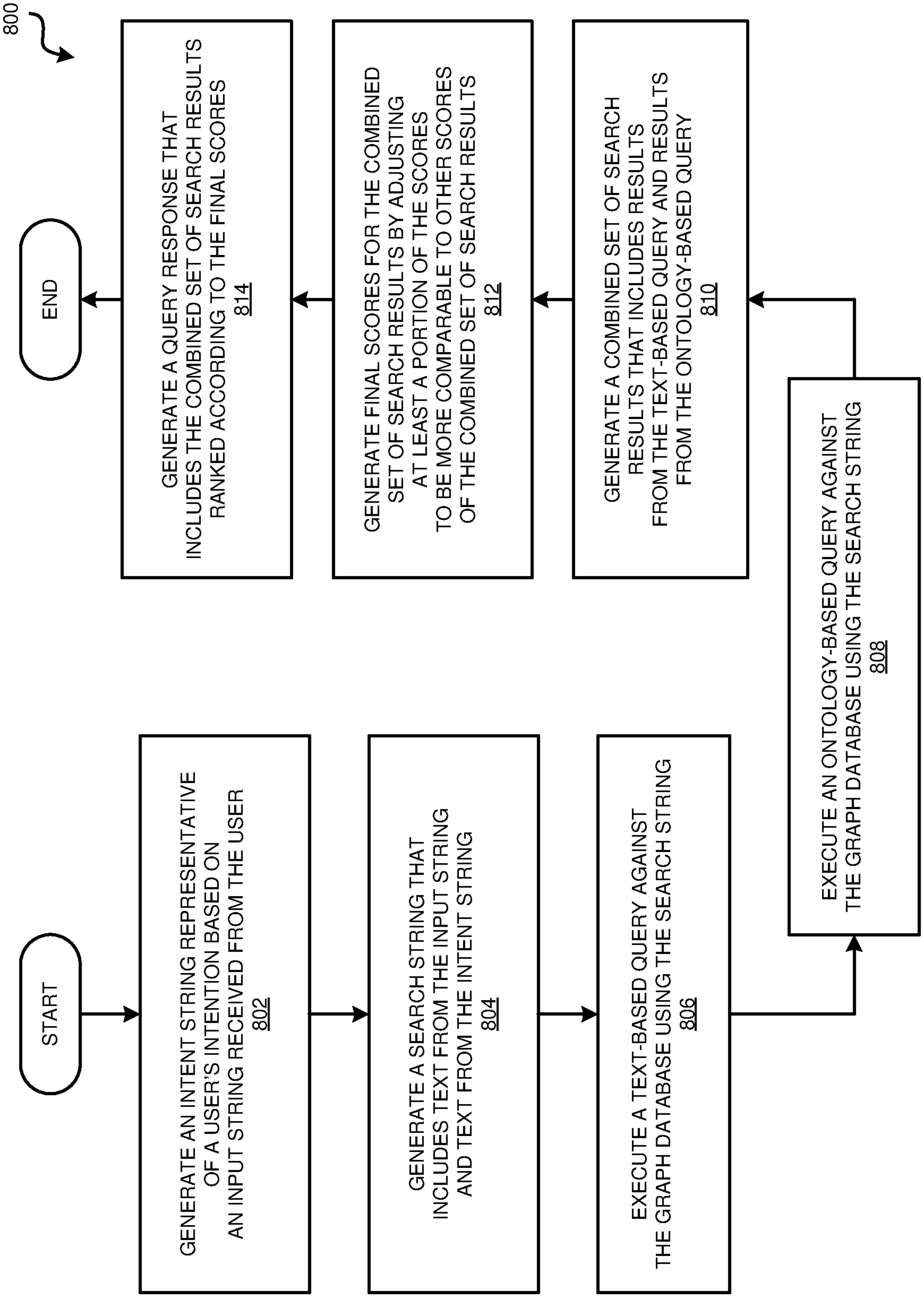
FIG. 8 depicts a flowchart of an example process for a hybrid database interface with intent expansion in accordance with an illustrative embodiment.

With reference to FIG. 8, this figure depicts a flowchart of an example process 800 for a hybrid database interface with intent expansion in accordance with an illustrative embodiment. In a particular embodiment, the data discovery system 306 carries out the process 800.

In an embodiment, at block 802, the process 800 generates an intent string representative of a user's intention based on an input string received as in input by the user. In some embodiments, the input includes a query request directed to querying a graph database. In some embodiments, the generating of the intent string comprises processing the input string using a natural language processing technique. In some embodiments, the generating of the intent string comprises extracting a phrase from the input string and generating a query embedding representative of the phrase. In some such embodiments, the generating of the intent string comprises extracting metadata from the graph database and generating a data embedding representative of the metadata. In some such embodiments, the generating of the intent string comprises ranking the data embedding among other data embeddings based on a comparison of the data embedding to the query embedding.

Next, at block 804, the process 800 generates a search string that includes text from the input string and text from the intent string. Next, at block 806, the process 800 executes a text-based query against the graph database using the search string. In some embodiments, the text-based query comprises matching the text from the input string and text from the intent string to textual properties of indexed nodes and relationships of the graph database. Next, at block 808, the process 800 executes an ontology-based query against the graph database using the search string. In some embodiments, the ontology-based query comprises generating a network template that includes text from the input string and text from the intent string and matching nodes and relationships of the graph database to the network template. Next, at block 810, the process 800 generates a combined set of search results from a first set of search results and a second set of search results, where the first set of search results is from the text-based query, and where the second set of search results is from the ontology-based query.

Next, at block 812, the process 800 generates final relevance scores for the combined set of search results by adjusting at least a portion of preliminary relevance scores of the combined set of search results. In some embodiments, the process 800 generates final relevance by normalizing the preliminary relevance scores of the first and second sets of search results. In some embodiments, if the process 800 identifies a table that is included in both the first and second sets of search results, the process 800 increases the preliminary relevance score of the table, for example by a predetermined percentage of the preliminary score. Next, at block 814, the process 800 generates a query response that includes the combined set of search results ranked according to the final relevance scores.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

generating an intent string representative of a user's intention based on an input string received as an input by the user, wherein the input includes a query request directed to querying a graph database;

generating a search string that includes text from the input string and text from the intent string, wherein the generating the search string further comprises:

processing the input string using a natural language processing technique to extract a phrase from the input string, producing an extracted phrase;

generating a vector embedding of the extracted phrase;

extracting one or more phrases from metadata associated with the graph database;

computing one or more embeddings for the one or more phrases extracted from the metadata;

identifying a closest phrase based on a similarity comparison between the vector embedding of the extracted phrase and the one or more embeddings for the one or more phrases extracted from the metadata; and appending text from the closest phrase to the search string;

executing a text-based query against the graph database using the search string;

executing an ontology-based query against the graph database using the search string;

generating a combined set of search results from a first set of search results and a second set of search results, wherein the first set of search results is from the text-based query, and wherein the second set of search results is from the ontology-based query;

generating final relevance scores for the combined set of search results by adjusting at least a portion of preliminary relevance scores of the combined set of search results; and generating a query response that includes the combined set of search results ranked according to the final relevance scores.

2. The computer-implemented method of claim 1, wherein the generating of the intent string comprises processing the input string using a natural language processing technique.

3. The computer-implemented method of claim 1, wherein the generating of the intent string comprises extracting a phrase from the input string and generating a query embedding representative of the phrase.

4. The computer-implemented method of claim 3, wherein the generating of the intent string comprises extracting metadata from the graph database and generating a data embedding representative of the metadata.

5. The computer-implemented method of claim 4, wherein the generating of the intent string comprises ranking the data embedding among other data embeddings based on a comparison of the data embedding to the query embedding.

6. The computer-implemented method of claim 1, wherein the text-based query comprises matching the text from the input string and text from the intent string to textual properties of indexed nodes and relationships of the graph database.

7. The computer-implemented method of claim 1, wherein the ontology-based query comprises generating a network template that includes text from the input string and text from the intent string and matching nodes and relationships of the graph database to the network template.

8. The computer-implemented method of claim 1, wherein the adjusting of at least a portion of the preliminary relevance scores comprises normalizing the preliminary relevance scores of the first and second sets of search results.

9. The computer-implemented method of claim 1, further comprising:

identifying a table that is included in both the first set of search results and the second set of search results, wherein the adjusting of at least a portion of the preliminary relevance scores comprises increasing the preliminary relevance score of the table responsive to identifying that the table is included in both the first set of search results and the second set of search results.

10. The computer-implemented method of claim 9, wherein the adjusting of the preliminary relevance score of the table comprises increasing the preliminary relevance score by a predetermined percentage of the preliminary relevance score.

11. A computer program product comprising one or more computer readable storage media, and program instructions collectively stored on the one or more computer readable storage media, the program instructions executable by a processor to cause the processor to perform operations comprising:

generating an intent string representative of a user's intention based on an input string received as an input by the user, wherein the input includes a query request directed to querying a graph database;

generating a search string that includes text from the input string and text from the intent string, wherein the generating the search string further comprises:

processing the input string using a natural language processing technique to extract a phrase from the input string, producing an extracted phrase;

generating a vector embedding of the extracted phrase;

extracting one or more phrases from metadata associated with the graph database;

computing one or more embeddings for the one or more phrases extracted from the metadata;

identifying a closest phrase based on a similarity comparison between the vector embedding of the extracted phrase and the one or more embeddings for the one or more phrases extracted from the metadata; and appending text from the closest phrase to the search string;

executing a text-based query against the graph database using the search string;

executing an ontology-based query against the graph database using the search string;

generating a combined set of search results from a first set of search results and a second set of search results, wherein the first set of search results is from the text-based query, and wherein the second set of search results is from the ontology-based query;

generating final relevance scores for the combined set of search results by adjusting at least a portion of preliminary relevance scores of the combined set of search results; and generating a query response that includes the combined set of search results ranked according to the final relevance scores.

12. The computer program product of claim 11, wherein the program instructions are stored in a computer readable storage device in a data processing system, and wherein the program instructions are transferred over a network from a remote data processing system.

13. The computer program product of claim 11, wherein the program instructions are stored in a computer readable storage device in a server data processing system, and wherein the program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

14. The computer program product of claim 11, wherein the generating of the intent string comprises processing the input string using a natural language processing technique.

15. The computer program product of claim 11, wherein the generating of the intent string comprises extracting a phrase from the input string and generating a query embedding representative of the phrase.

16. The computer program product of claim 11, further comprising:

identifying a table that is included in both the first set of search results and the second set of search results, wherein the adjusting of at least a portion of the preliminary relevance scores comprises increasing the preliminary relevance score of the table responsive to identifying that the table is included in both the first set of search results and the second set of search results.

17. A computer system comprising a processor and one or more computer readable storage media, and program instructions collectively stored on the one or more computer readable storage media, the program instructions executable by the processor to cause the processor to perform operations comprising:

generating an intent string representative of a user's intention based on an input string received as an input by the user, wherein the input includes a query request directed to querying a graph database;

generating a search string that includes text from the input string and text from the intent string, wherein the generating the search string further comprises:

processing the input string using a natural language processing technique to extract a phrase from the input string, producing an extracted phrase;

generating a vector embedding of the extracted phrase;

extracting one or more phrases from metadata associated with the graph database;

computing one or more embeddings for the one or more phrases extracted from the metadata;

identifying a closest phrase based on a similarity comparison between the vector embedding of the extracted phrase and the one or more embeddings for the one or more phrases extracted from the metadata; and appending text from the closest phrase to the search string;

executing a text-based query against the graph database using the search string;

executing an ontology-based query against the graph database using the search string;

generating a combined set of search results from a first set of search results and a second set of search results, wherein the first set of search results is from the text-based query, and wherein the second set of search results is from the ontology-based query;

generating final relevance scores for the combined set of search results by adjusting at least a portion of preliminary relevance scores of the combined set of search results; and generating a query response that includes the combined set of search results ranked according to the final relevance scores.

18. The computer system of claim 17, wherein the generating of the intent string comprises processing the input string using a natural language processing technique.

19. The computer system of claim 17, wherein the generating of the intent string comprises extracting a phrase from the input string and generating a query embedding representative of the phrase.

20. The computer system of claim 17, further comprising:

identifying a table that is included in both the first set of search results and the second set of search results, wherein the adjusting of at least a portion of the preliminary relevance scores comprises increasing the preliminary relevance score of the table responsive to identifying that the table is included in both the first set of search results and the second set of search results.

* * * * *